United States Patent [19]
Piffath et al.

[11] 3,709,462
[45] Jan. 9, 1973

[54] SLIT REGULATOR FOR GAS LIGHTER

[75] Inventors: Rodney S. Piffath, Northridge; John J. Cole, Beverly Hills, both of Calif.

[73] Assignee: Butana Match A.G., Zurich, Switzerland

[22] Filed: Dec. 28, 1970

[21] Appl. No.: 101,824

[52] U.S. Cl. .................251/118, 138/45, 431/142, 431/344, 137/525.1
[51] Int. Cl. .............................................F23d 15/02
[58] Field of Search........137/493, 525, 525.1, 525.3; 251/118; 138/40, 42, 44, 45, 46; 251/119, 120, 122, 125; 431/344, 142, 130, 150, 277; 222/490, 3

[56] References Cited

UNITED STATES PATENTS

| | | | |
|---|---|---|---|
| 1,865,764 | 7/1932 | Keenan | 137/525.1 X |
| 3,072,151 | 1/1963 | Quercia | 138/45 |
| 3,326,456 | 6/1967 | Le Blanc Jr. | 137/525.1 X |
| 2,644,663 | 7/1953 | Klingler | 137/525.1 |
| 2,896,661 | 7/1959 | Becker et al | 137/525.1 X |
| 3,523,006 | 8/1970 | Piffath et al. | 431/344 |

*Primary Examiner*—Henry T. Klinksiek
*Assistant Examiner*—Robert J. Miller
*Attorney*—Lyon & Lyon

[57] ABSTRACT

A gas lighter has a cartridge containing fuel under pressure, and containing a pressure reducing regulator comprising a disc of plastic material having a slit extending from the periphery to the center. The slit is formed by a sharp thin blade and no material is removed. The disc is accurately sized on diameter and is contained within an accurately sized bore provided in the cartridge. A separate metallic head assembly is provided with a screw having a tapered end. Turning movement of the head assembly relative to the cartridge drives the end of the screw into the cartridge to puncture a wall thereof. Fuel under pressure passes through the slit disc regulator and through the punctured opening and through passages to reach a flame port in the head assembly.

3 Claims, 6 Drawing Figures

PATENTED JAN 9 1973 3,709,462

INVENTORS
RODNEY S. PIFFATH
JOHN J. COLE

BY Lyon & Lyon
ATTORNEYS

SLIT REGULATOR FOR GAS LIGHTER

This invention relates to an improved and simplified form of pressure reducing regulator for gas lighters using pressurized fuel such as, for example, butane. The required reduction in pressure is severe because the fuel exists within the fuel cartridge at a pressure on the order of 100 pounds per square inch but must be reduced to a pressure on the order of a small part of an ounce per square inch for the flame.

Moreover, the pressure reducing regulator must be capable of economical manufacture on a quantity production basis, because it is contained within the fuel cartridge which may be discarded when the fuel supply is exhausted. It has been found that a resilient plastic disc formed of, for example, nylon or teflon and provided with a radial slit extending inward from the periphery provides a very accurate, reliable and inexpensive pressure reducing regulator for this service. The thickness of the disc may be on the order of one-half the diameter, although this is not critical. The slit is made in the disc by a razor-sharp knife which does not remove any material, and the disc is confined within a bore which fits the outer periphery of the disc very accurately. Apparently the butane molecules are able to pass through the labyrinth passage formed by the knife slit, although the sides of the slit are closed together and maintained closed by the encompassing bore which receives the disc.

Except for this slit regulator, the other constructional features of the gas lighter device are shown in our prior U.S. Pat. No. 3,523,005, granted Aug. 4, 1970.

Other and more detailed objects and advantages will appear hereinafter.

Figure 3:
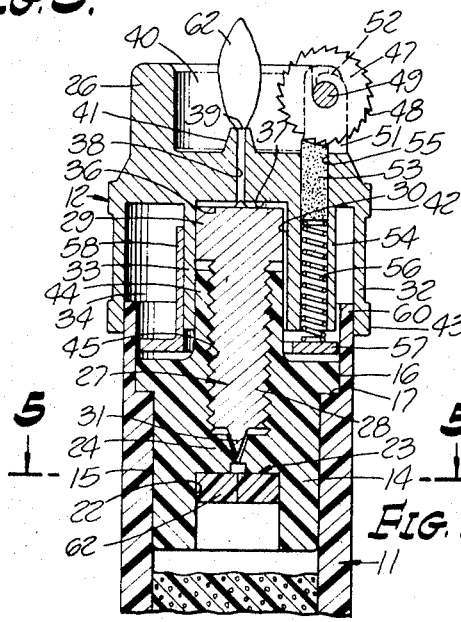
Figure 2:
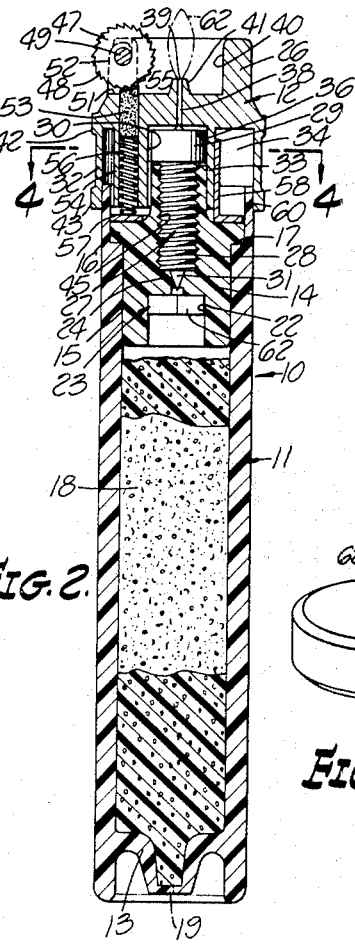
FIG. 2 is a longitudinal sectional view taken substantially on the lines 2—2 as shown in FIG. 1.

FIG. 3 constitutes an enlargement of the upper portion of FIG. 2.

Figure 4:
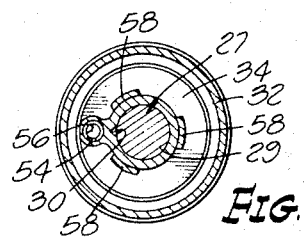

FIG. 4 is a transverse sectional view taken substantially on the lines 4—4 as shown in FIG. 2.

Figure 1:
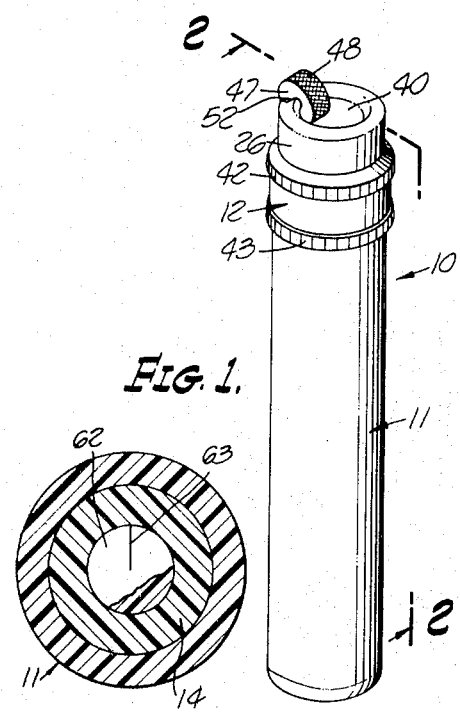
FIG. 1 is a perspective view showing a preferred embodiment of this invention.
Figure 5:
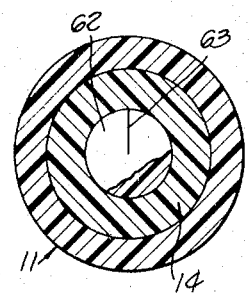

FIG. 5 is a transverse cross-section taken substantially on the lines 5—5 as shown on FIG. 3.

Figure 6:
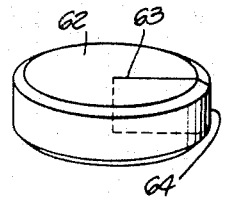

FIG. 6 is a perspective view of the slit regulator.

Referring to the drawings, the lighter device generally designated 10 comprises a cartridge 11 containing fuel under pressure, and a head assembly 12. As shown in the drawings, the cartridge 11 comprises a cylindrical container or tank formed of thermoplastic material suitable for injection molding. One end of the cartridge 11 is closed by an end wall 13, and the other end is closed by a plug element 14, also formed of thermoplastic material. The plug element may be sealed to the wall of the cartridge 11 in any preferred or convenient manner. We have found that the conventional technique of spinning the plug element with respect to the cartridge to form a heat seal 15 gives satisfactory results. A flange 16 on the plug element 14 rests on a shoulder 17 on the cartridge 11.

The chamber 18 within the cartridge 11 may contain open cell polyether foam, and pressurized fuel such as butane fills the chamber 18 and the foam. A filling opening 19 in the bottom wall 13 provides for initial introduction of the fuel into the chamber 18, and this opening is later closed by a spinning process.

The closure element 14 is provided with an internal recess 22 which contains a pressure regulator generally designated 23. This regulator comprises a disc formed of plastic material such as, for example, nylon or teflon. The disc, generally designated 62, is resilient and may have a hardness in the range of 70 durometer. The disc 62 has a thickness about one-half its diameter and is provided with a slit 63 extending radially from the circumference to the center. The slit 63 is formed by a razor-sharp knife, not shown, which does not remove any material. The outer cylindrical surface 64 of the disc as well as the encompassing bore 22 are both very accurately sized. In a typical example, the outer diameter of the disc 62 may be between 0.250 and 0.251 inch, while the inner diameter of the bore 22 may be between 0.251 and 0.252 inch, and the thickness of the disc 62 is about one-eighth inch. The bore 22 keeps the slit 63 closed. The gas seeps out of the slit at a very low rate in a fine mist, with the liquid globules broken down.

The barrier wall 24 of the closure element 14 is initially imperforate, so that the pressurized fuel is confined within the cartridge 11 and cannot escape.

The head assembly 12 includes a head casting 26 and a metal screw 27 fixed to the casting. The casting 26 is designed so that it may be produced by low cost die casting procedures, and the screw 27 is a screw machine product. The screw 27 has a portion with external threads 28 and a smooth portion 29. The lower end of the screw 27 is provided with a tapered point 31. The casting 26 is provided with an outer peripheral skirt 32 and an inner concentric sleeve 33, defining an annular space 34 between them. The wall 36 is provided with radiating channels 37. The screw 27 is assembled relative to the casting 26 by pressing the smooth portion 29 into the interior of the central sleeve 33 until the upper end of the screw 27 engages the end wall 36. The channel 30 in the wall of the sleeve 39 communicates with the channels 37 in the casting 26, and the latter communicate with the axial passage 38 which leads to the flame port or outlet port 39. The port 39 emerges into the recess 40 through a protuberance 41 projecting into the recess. After assembly, the casting 26 and screw 27 function as a single integral unit.

The casting 26 may be knurled or otherwise roughened on its outer surface, as shown at 42 and 43, to facilitate manual grasping of the head assembly 12 for turning it with respect to the cartridge 11. The plug element 14 is provided with a central upstanding tubular portion provided with internal threads 45. When the screw 27 is threaded into the plug element 14, the lower tapered end 31 first punctures the barrier wall 24. Turning movement of the head assembly 12 in the opposite direction then lifts the tapered end 31 of the screw to permit flow of fuel under pressure through the regulator 23, and through the small opening pierced in the barrier wall 24, and through the clearance space between the internal threads 45 and external threads 28. The screw threads thus form a helix path for flow of fuel under pressure to the upper end of the plug element 14. The fuel under pressure then flows upward through the axial channel 30 and radial channels 31 to the passageway 38 and to the outlet port 39.

Sparking means is provided for igniting the fuel escaping from the outlet port 39 to form a flame. As shown in the drawings, this sparking means includes a wheel 47 having a serrated periphery 48 and provided with oppositely extending integral hubs 49. These hubs 49 are received in aligned recesses provided on the upper wall of the casting 26, and the wheel 47 extends through a slot 51. A portion of the wall 52 is deformed by a staking operation to retain both hubs 49 in position, to prevent disassembly. A solid cylinder of spark-producing material 53 is slidably mounted within the integral guide tube 54 provided on the head casting 26, and extends through the opening 55. The coil compression spring 56 within the tube 54 urges the member 53 in an upward direction to contact the periphery 48 of the wheel 47. The lower end of the spring 56 engages the flange 57 which is supported on the outer surface of the sleeve 33 by friction-gripping leg elements 58. It will be observed that the tube 54 and spring 56 are positioned in the annular space 34 between the skirt 32 and the central sleeve 33. The skirt telescopes over the upward extending rim 60 to exclude foreign matter from the annular space 34.

In operation, the cartridge 11 is connected to the head assembly 12 by relative turning movement along the threads 28 and 45, to cause the tapered end 31 of the screw 27 to puncture the barrier wall 24, as described above. The head assembly 12 is then turned in the opposite direction for a part of one revolution to permit gas under pressure to escape through the outlet port 39. The sparking wheel 47 is then manually rotated to ignite the fuel and form a flame 62 at the outlet port 39. The protuberance 41 keeps the flame spaced from the floor of the recess 40 to minimize transfer of the heat into the head casting 26. The height of the flame 62 is adjusted by turning of the head assembly 12 with respect to the cartridge 11; this relative turning movement changes the spacing of the tapered end 31 of the screw with respect to the opening which it has pierced in the barrier wall 24, and this tapered portion 31 serves as a valve to regulate the height of the flame 62. The maximum height of the flame is pre-set by the regulator 23. In order to extinguish the flame, the head assembly 12 is turned with respect to the cartridge 11 to move the tapered end 31 of the screw 27 back into the barrier wall opening to shut off all flow of gas. From the above description, it will be understood that the screw 27 serves as the sole connecting means between the head assembly 12 and the fuel cartridge 11, pierces the cartridge wall 24 to permit escape of fuel under pressure, provides a helix flow path through the clearance space between the threads 28 and 45, and serves as a regulator valve for adjusting the height of the flame, and as a shutoff valve for extinguishing it.

When the supply of fuel has been exhausted from the cartridge 11, the head assembly 12 is unscrewed from the cartridge and the cartridge is thrown away. A new duplicate cartridge having a supply of fuel under pressure is then threadedly connected by inserting the screw 27 into the internal threads 35 and then turning the head assembly 12 to cause the tapered end 31 to pierce the barrier wall 24. Subsequent operation of the lighter device 10 is the same as that previously described.

Having fully described our invention, it is to be understood that we are not to be limited to the details herein set forth but that our invention is of the full scope of the appended claims.

We claim:

1. A pressure reducing device for regulating the flow of pressurized gas from a container, comprising a nonmetallic resilient circular disc having a closed slit extending inward from its periphery through which the gas may seep, the disc having a thickness equal to about one-half its diameter, the slit being formed by a sharp instrument without removal of material from the disc so that the walls of the slit when closed form a labyrinth passage, and means confining said resilient member on its periphery to keep the slit walls in closed contact.

2. The device set forth in claim 1 in which the disc is formed of plastic material having a durometer hardness of about 70.

3. The device set forth in claim 1 in which the slit extends radially to the center of the circular disc.

* * * * *